United States Patent [19]
Steinhauser et al.

[11] Patent Number: 5,786,838
[45] Date of Patent: Jul. 28, 1998

[54] SELF-ERASING THERMOCHROMIC WRITING BOARD AND SYSTEM

[75] Inventors: Louis P. Steinhauser; A. Konrad Juethner, both of St. Louis, Mo.

[73] Assignee: Watlow Electric Manufacturing Company, St. Louis, Mo.

[21] Appl. No.: 626,118

[22] Filed: Apr. 1, 1996

[51] Int. Cl.⁶ .................................................. B41M 5/00
[52] U.S. Cl. ................................................. 347/179
[58] Field of Search ............................. 347/171, 172, 347/175, 179

[56] References Cited

U.S. PATENT DOCUMENTS

| | | | |
|---|---|---|---|
| 3,090,687 | 5/1963 | Berman | 96/48 |
| 3,219,993 | 11/1965 | Schwertz | 340/324 |
| 3,513,570 | 5/1970 | Dil Pare | 35/66 |
| 4,033,690 | 7/1977 | Moraw | 399/132 |
| 4,093,344 | 6/1978 | Damen et al. | 350/147 |
| 4,142,782 | 3/1979 | O'Brian | 350/354 |
| 4,169,661 | 10/1979 | Yamada et al. | 350/353 |
| 4,442,429 | 4/1984 | Kotani et al. | 340/786 |
| 4,445,787 | 5/1984 | Parker | 374/141 |
| 4,554,565 | 11/1985 | Kito et al. | 346/201 |
| 4,724,445 | 2/1988 | Amano et al. | 347/179 |
| 4,917,643 | 4/1990 | Hippeley et al. | 446/14 |
| 4,983,810 | 1/1991 | Balderson | 219/462 |
| 5,194,183 | 3/1993 | Munch et al. | 252/586 |
| 5,202,677 | 4/1993 | Parker et al. | 340/786 |
| 5,219,625 | 6/1993 | Matsunami et al. | 428/30 |
| 5,223,958 | 6/1993 | Berry | 359/43 |
| 5,231,505 | 7/1993 | Watanabe et al. | 358/296 |
| 5,262,374 | 11/1993 | Okabe et al. | 503/201 |
| 5,274,460 | 12/1993 | Yamada et al. | 358/296 |
| 5,282,651 | 2/1994 | Alonso | 283/117 |
| 5,352,649 | 10/1994 | Shibahashi et al. | 503/207 |
| 5,363,516 | 11/1994 | Butts | 4/661 |
| 5,441,418 | 8/1995 | Brown et al. | 434/85 |
| 5,503,583 | 4/1996 | Hippely et al. | 446/14 |
| 5,635,319 | 6/1997 | Hotta et al. | 347/179 |

*Primary Examiner*—Matthew V. Nguyen
*Attorney, Agent, or Firm*—Herzog, Crebs & McGhee, LLP

[57] ABSTRACT

A self-erasing writing system includes a writing surface structure, a writing instrument, and an erasing structure. The writing surface is preferably a laminate structure having a layer of a thermochromic material. The thermochromic material is of one color when within a certain temperature range (e.g. room temperature), but changes to a second color when the material is brought into a second temperature range (e.g. a lower temperature). The writing instrument is a temperature controlled cooled tip device that lowers the thermochromic material to within the second temperature range at the point of contact such that the points of contact become the second color. The thermochromic material has a "memory" that retains the second color until the temperature is raised to within a third temperature range at which time the thermochromic material changes back to its first color. The erasing structure is a heater either layered integral with the laminate structure or a separately applied heater as in the form of a conventional eraser. Several layers of thermochromic material may be used to provide various colors when used with a variable temperature writing instrument.

36 Claims, 3 Drawing Sheets

SELF-ERASING THERMOCHROMIC WRITING BOARD AND SYSTEM

FIELD OF THE INVENTION

The present invention relates to writing systems having a writing surface and a writing instrument suitable for producing markings or writing on the writing surface and, more particularly, to a self-erasing writing surface and writing instrument therefor.

BACKGROUND OF THE INVENTION

It has long been preferable to have a writing system wherein the text and/or pictures drawn thereon may be erased after creation. An example of such a successful writing system is the use of graphite, as in a pencil, with paper. A rubber eraser is used to remove the markings made by the graphite on the paper. However, such a system is not practical for use on a large scale. Furthermore, erasure creates rubber dust. For large scale purposes, a slate blackboard and chalk system was developed. The chalk on the blackboard constituting the writing or picture may be removed by a felt eraser applied to the surface of the blackboard. However, the removal of the chalk from the blackboard also creates dust that will adhere to clothes and other items. Furthermore, the chalk will smear or smudge when rubbed. Also, while chalk is made in different colors, the blackboard is not an advantageous writing system.

Another recent type of writing system is known as a whiteboard. The whiteboard is a hard, smooth white writing board onto which special felt tipped ink writing pens may be used. The board is composed of a material that allows the ink to be erased or wiped from the board. Again, however, the removal of the ink from the whiteboard creates ink dust that also will adhere to clothes and other items. The advantage of the whiteboard over conventional blackboards is the lighter weight of the board and use of vibrant colored inks on a white medium. However, the whiteboard suffers from the same problems as the other systems.

Over the years, other types of erasable writing systems have been developed, especially for use as presentation boards and the like. One example is set forth in U.S. Pat. No. 3,067,530 (the '530 Patent) issued to Bolsey in 1962. The '530 patent teaches a writing board having a silicone treated writing surface and heating elements. A meltable greasy substance is utilized as the writing material that is applied to the board. The greasy substance leaves marks on the board at room temperature. When it is desired to erase the writing, the heating elements are activated which melts the greasy substance. The greasy substance flows off of the writing board and is removed. Obviously, this is not a suitable solution.

U.S. Pat. No. 3,513,570 (the '570 Patent), issued to A. L. Dil Pare on May 26, 1970 discloses a self-erasing writing system provided by the combination of a temperature controlled writing surface and a writing instrument. Various embodiments of such a writing system are discussed within the specification. Of these writing systems, there is mentioned and claimed a thermochromic writing board with a cooled-tip stylus. However, the specification is vague as to the particulars of such a writing system, as there is no mention of a specific structure for carrying out the particular embodiment of the invention. Thus, while a thermochromic-type writing system is mentioned one would not be able to practice the invention based on the specification without undue experimentation, idea generation and development work to get to the present invention.

U.S. Pat. No. 4,442,429 (the '429 Patent), issued to Kotani et al. on Apr. 10, 1984, discloses a display device utilizing a heat sensitive medium having a hysteresis effect relative to temperature change. The display medium is a continuous band of a thermally responsive color change material on a polyester film. A separate transparent heater in the form of a panel of glass with $SnO_2$ is used to maintain the temperature of the display medium elevated. Elevating the temperature of the display medium to 50° C. (122° F.) causes a color change. This is effected by an array of heating elements that are selectively activated to provide images and writing. The panel heater maintains the temperature of the display medium elevated to 40° C. (104° F.), as cooling of the display medium to 26° C. (approximately room temperature of 78.8° F.) erases the writing. The panel heater is backlit to illuminate the display medium, with filters in front of the display medium to provide better contrast of the color change.

Such a display device as the '429 Patent has definite drawbacks compared to the simplicity of the present writing board and system. First, the '429 display device utilizes a thermochromic material that changes upon the material attaining an elevated temperature that is well above room temperature, and must be maintained near the elevated temperature for the writing to remain. Second, the writing disappears at room temperature. Third, filters are necessary to clearly differentiate the change in color, which also must be backlit for viewing.

It is therefore an object of the present invention to provide a writing system that does not create any residue upon creation of marks on the writing surface or upon erasure of the marks.

It is another object of the present invention to provide a self-erasing writing board.

It is yet another object of the present invention to provide a self-erasing writing system utilizing a thermochromic writing board in conjunction with a cooled-tip writing instrument.

It is still another object of the present invention to provide a multiple color self-erasing writing board.

It is further an object of the present invention to provide a thermally controlled writing instrument for use with any of the above writing boards.

SUMMARY OF THE INVENTION

In one form thereof, the present invention is a self-erasing thermochromic writing surface. The thermochromic writing surface exhibits a base or first color when the writing surface is within a specific temperature range, generally room temperature. When the temperature of any portion or all of the thermochromic writing surface is lowered to be within a writing temperature range, the writing surface or portion thereof brought into the writing temperature range exhibits a secondary color. Because of the hysteresis feature of the thermochromic material, the secondary color will not vanish even when the temperature of the writing surface falls or rises to within room temperature (retention temperature range). When the temperature of the writing surface or portion thereof having the writing thereon is raised past the retention temperature range into an erasure temperature range, the secondary color vanishes and the writing surface returns to the base color. As the temperature of the writing surface returns to the retention or room temperature range, the previous secondary color writing will not reappear. Only when the writing surface or portion thereof is lowered into the writing temperature range will the point of contact change to the secondary color. A thermally controlled writing instrument is used to lower the temperature of the writing surface at the point of contact therebetween.

The present invention is based on the action of encapsulated organic pigments that perform a color change upon temperature variation. These encapsulated organic pigments or thermochromics have advanced to the point wherein a memory feature or hysteresis effect is incorporated therein. This makes possible the display and retention of a color change upon such variation in temperature. Because the thermochromic material is of microscopic size, it can be packaged in either an ink or paint and then applied to a multitude of substrates in a variety of ways (e.g. spray painting, screen printing).

According to an aspect of the present invention, the writing surfaces can be categorized into two main groups. These two groups are the sheet approach (rigid) and the flexible film approach (flexible). With the sheet approach, a hard plastic sheet such as ABS, PVC or the like, serves as the rigid carrier substrate for the thermochromic material. The thermochromic material is applied onto the carrier substrate. An optional protective layer may be applied on the thermochromic material layer to protect the thermochromic material from scratches and the like that may compromise the operation of the writing surface. With the flexible film approach, a thin polyester film or similar material is used as the carrier substrate with the thermochromic layer disposed thereon. The optional protective layer may be applied over the thermochromic layer.

In order to erase the writing on the thermochromic writing surface, whether it is the sheet or flexible film approach, it is necessary to raise the temperature of the writing surface to a predetermined point (erasure temperature range). This may be accomplished in several ways. One way is by application of a portable heat generating spot eraser to the writing surface at the point of desired erasure. Another way is by heating the entire writing surface by an integral heater wherein all of the writing on the writing surface is erased. Still another way is by heating a portion of the thermochromic material by an integral matrix type heater.

In the case of the entire and matrix heater, a layer of an electrically conducting material, such as indium tin oxide (ITO), is deposited on the substrate preferably underneath the thermochromic layer, and thus between the carrier substrate and the thermochromic layer. The ITO layer is coupled to a source of electric power which, when applied to the ITO layer generates heat which, through conduction, raises the temperature of the thermochromic layer.

The ITO layer may, for example, be sputtered onto the polyester film or deposited thereon by chemical vapor deposition. Electrical bus strips are applied or coupled to the ITO layer in order to provide electrical power thereto. The bus strips are then coupled to the source of electrical power.

In the case of the portable spot eraser, a layer or coating of ITO is deposited on a substrate with the substrate joined to the eraser structure. A conventionally heated block system may also be used, such as a resistance wire heater. The only requirement is for the eraser to provide heat adequate to raise the temperature of the board to within the erasure temperature range. The electrical power for the eraser may be produced by batteries contained within the eraser structure, or may be coupled to an external electrical power source via an electrical cord or the like. The portable spot eraser may be coupled to the electrical supply circuit of the writing board.

With both the sheet and flexible film approaches, the carrier substrate should be as thin as possible in order to minimize the thermal mass of the substrate and therefore allow for quick thermal response of the thermochromic layer. As the thickness of the carrier substrate increases so does its thermal mass and its heat absorbing properties. Additionally, the thermodynamic properties of a low specific heat and a high thermal conductivity should be incorporated into the design to optimize the thermal response of the present writing board and system.

Encapsulated organic pigments (thermochromic material) may be engineered to various temperature specifications, therefore the writing temperature range, erasure temperature range, and retention temperature range can be made to vary. Additionally, the secondary color may be engineered to any of a variety of colors while the base color may remain constant. By utilizing layers or coatings of various types of thermochromic material, it is possible to provide a self-erasing writing structure wherein the writing may be in various colors. It is also possible to mix thermochromic inks of various secondary colors and deposit that mix as one layer, the end result being the same as separate layers.

The individual colors are brought out on the writing surface by varying the application temperature of the writing instrument as each color would have a separate writing temperature range. Thus, when the temperature of the writing instrument is within the writing temperature range of the particular thermochromic layer, that particular color appears. It is important to realize that the thermochromic material with the highest writing temperature range needs to be the bottom layer, as this layer or color will be the first color to appear. Also, because other thermochromic layers producing other colors have progressively lower writing temperature ranges, the thermochromic layers having higher writing temperature ranges will naturally change to their particular color upon application of the thermally controlled writing instrument that is set at a lower temperature, such as when desiring to produce a different color on the writing surface. Thus, the color seen by the eye will be a combination of the colors of the various changed thermochromic layers. Therefore, color (thermochromic layer) and its writing temperature range must be chosen with color composition principles in mind. As the temperature of the writing instrument goes lower, each successive thermochromic layer will display its color thereby creating a further composite color.

The writing instrument that creates the writing is a cooled tip writing pen. According to one embodiment of the writing instrument, a self-contained pen body includes batteries for supplying electrical power to a thermoelectric module. The thermoelectric module is coupled to a tip that is applied to the writing surface. The thermoelectric module operates on the Peltier effect to cool the tip to within the writing temperature or color changing temperature range of the thermochromic material. Application of the cooled tip to the writing surface thus creates markings on the writing surface. Of course, the pen may be coupled to an external power source. A power supply may be incorporated into the writing board. Another way of providing a cooled tip writing instrument would be to circulate a coolant delivered from a chiller (not shown) that is disposed in the writing board.

Various feature may be incorporated into the writing instrument. Such features may include an automatic shutdown or low power consumption mode in order to conserve energy when the pen is temporarily not in use. Also, in the case of a color writing surface, a single pen with a temperature controller may be utilized for providing the necessary variation in tip temperature rather than providing separate pens of a predetermined temperature range.

In summary, the present invention provides a self-erasing, temperature sensitive writing system onto which information may be written by making use of encapsulated organic pigments (thermochromic material). The color of the pigments is changed through local cooling of the writing surface by means of a cooled tip writing pen. The information is erased by activating surface heaters.

BRIEF DESCRIPTION OF THE DRAWINGS

So that the manner in which the above-recited features, advantages, and objects of the present invention are attained and can be understood in detail, a more particular description of the invention, briefly summarized above, may be had by reference to the embodiments thereof which are illustrated in the appended drawings.

It is noted, however, that the appended drawings illustrate only typical embodiments of this invention and is therefore not to be considered limiting of its scope, for the invention may admit to other equally effective embodiments. Reference the appended drawings, wherein.

DETAILED DESCRIPTION OF THE PREFERRED EMBODIMENT

Figure 1:
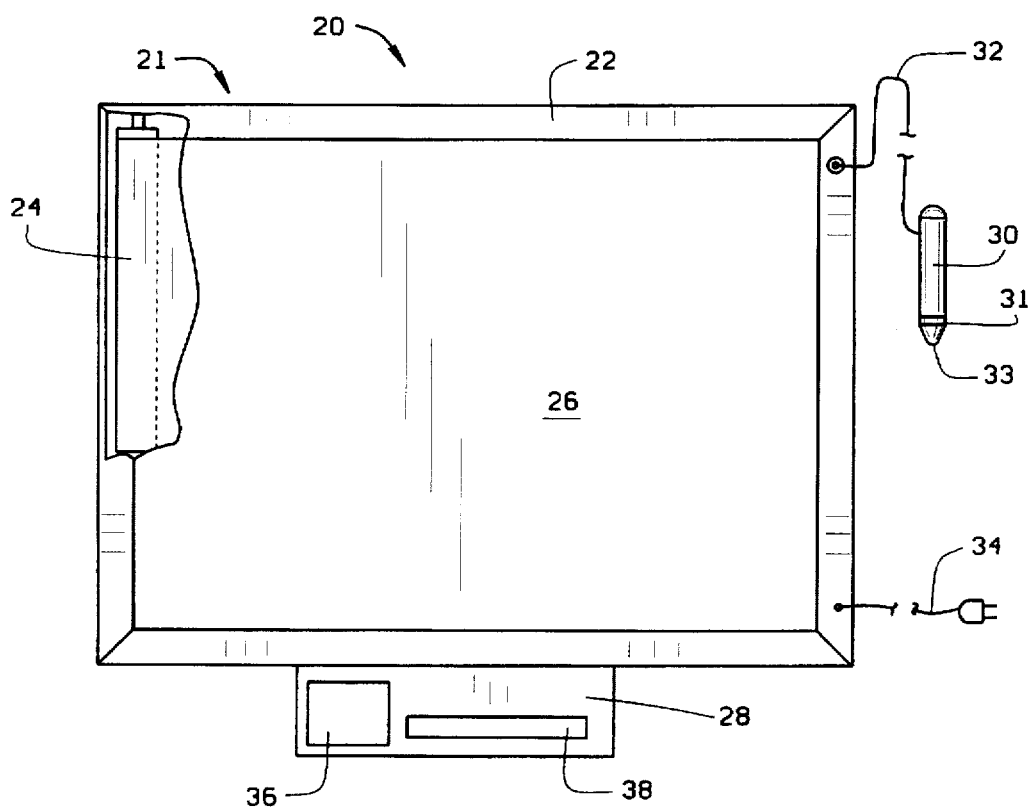
FIG. 1 is a front view of a writing board incorporating the present self-erasing thermochromic structure with an attached writing instrument therefor, the writing board including a frame incorporating a wrap-around writing surface and copy mechanism.

With reference now to FIG. 1, there is depicted a writing system generally designated 20 consisting of a writing surface structure 21 and a writing instrument 30. The writing structure 21 has a frame 22 surrounding a self-erasing writing surface 26. In this particular embodiment, the writing surface 26 is a continuous sheet wrapped around and driven by rollers, of which only one such roller 24 is shown, the rollers situated at the longitudinal ends of the frame 22. The rollers are mechanically coupled to an advancing mechanism (not shown) that is electrically coupled to a copy control mechanism 28, the copy control mechanism including a control panel 36 and a copy paper output slot 38. Such a writing surface structure, absent the self-erasing feature, and copying mechanism is known in the art, such as a Panasonic® Panaboard™ Electronic Print Board model KX-B520. In accordance with an aspect of the present invention, the present self-erasing writing surface 26 is adapted for use in such a board copying system.

The writing system 20 further includes a writing instrument 30 that is here depicted as being coupled to the frame 22 via a cord 32. As described below, the writing instrument 30 is a cooled-tip writing implement that may be coupled via a cord to an electrical source for the receipt of power necessary to achieve the cooling of the tip 33 through a thermoelectric module 31. Alternatively, the writing implement 30 may utilize a liquid or gas coolant. In this case, the cord or hose 32 would supply or circulate the coolant to the pen. The writing system 20 is coupled to a source of electrical power via an electrical cord 34 for supplying the power necessary to operate the copying feature as well as the warming or heating of the writing surface 26 as described in detail hereinbelow.

The writing surface 26 is shown as being utilized in the writing system 20 of FIG. 1. This is because one embodiment of the writing surface 26 is a flexible sheet that may be formed as one continuous flexible sheet. In this regard, the writing surface 26 is capable of wrapping around the rollers 24 to thereby provide "two" writing surfaces, one of which is behind the forward or exposed writing surface. The two writing surfaces are alternatingly exposed for writing thereon when the rollers are actuated to move the flexible sheet therearound. In this manner, the rear writing surface may be copied or, in the alternative, preserved while the front writing surface is used.

The exact nature of the writing surface 26 and its operation is described hereinbelow. However, it should be appreciated that the flexible writing surface 26, in conjunction with the pen 30 provides residue free marking and erasing in accordance with the below description thereof.

Figure 2:
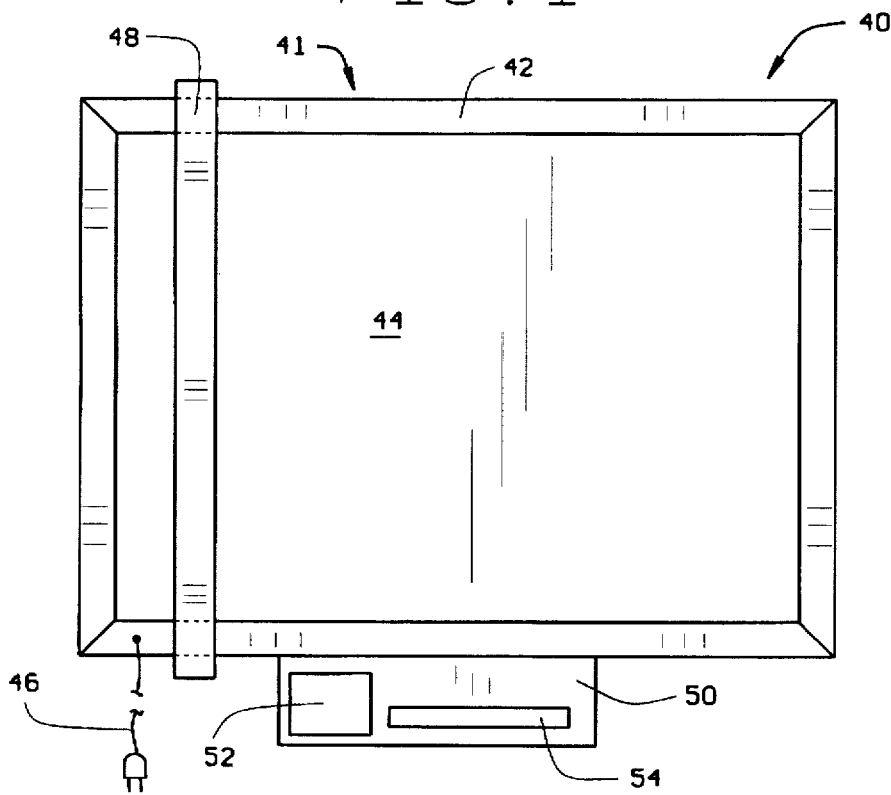
FIG. 2 is a front view of another embodiment of a writing board incorporating the present self-erasing thermochromic structure for use with a stand alone writing instrument, the writing board including a carriage-type copy mechanism.

With reference to FIG. 2 there is shown another writing system generally designated 40. The writing system 40 has a frame 42 surrounding a writing surface 44. In this embodiment, the writing surface 44 does not revolve or rotate but is static. Furthermore, the writing surface 44 may be the same flexible film sheet as in the writing system 20 of FIG. 1 but with a rigid substrate carrier, or may be a laminate structure variation to the flexible film approach, both of which are described hereinbelow. Electrical power for the various components of the board 41 is supplied via an electrical line/plug 46 that is adapted to be coupled to a standard electrical outlet for receipt of electrical power. A carriage type board copying mechanism 48, as is well known in the art, is coupled to the frame 42. The carriage 48 moves across the writing surface 44 to copy the writing thereon. A print control box 50 having a control panel 52, paper output slot 54, and the necessary electronics (not shown) is attached to the lower part of the frame 42 and electrically coupled to the electrical power source. Other types of copying mechanisms may also be used. In this writing system 40, no writing instrument is shown. It should be understood that a stand alone writing instrument such as will be described hereinbelow with reference to FIG. 5 may be used. Alternatively, an attached writing instrument may be used, as in the writing system 20 of FIG. 1.

It should now be appreciated that the writing systems and surfaces depicted in FIGS. 1 and 2 are only illustrative of the types of uses or applications for the present invention. The thermochromic writing structure has many applications; a "whiteboard" being only one specific application. In the case of such "whiteboards" as depicted in FIGS. 1 and 2, the board copying feature may or may not be needed. The board will, of course, function properly without the copy feature.

Figure 3:
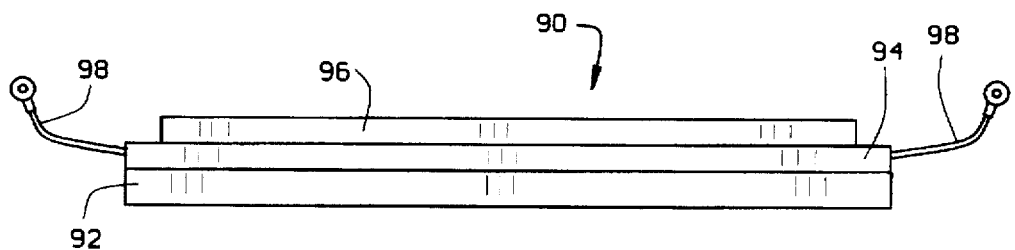
FIG. 3 is an enlarged side view of an embodiment of the self-erasing thermochromic structure, depicting the various laminations or layers.

Referring now to FIG. 3, an embodiment of the writing surface as may be used in the writing system of FIG. 2 and other applications is shown. In general terms, FIG. 3 is an embodiment of the sheet approach writing surface, generally designated 90. The writing surface 90 includes a carrier substrate 92 such as hard rubber, PVC, masonite (or other hard laminate), ABS plastic or the like. The carrier substrate 92 is the rigid form for the writing surface. Disposed on the carrier substrate 92 is a layer 94 of an electrically conducting metal or like material capable of generating heat when electric power is applied thereto. Electrically coupled to the heater layer 94 are electrical leads 98. The electrical leads 98 are adapted to be electrically connected to an electrical power source (not shown) and optionally to a heater controller (not shown). Disposed on the layer 94 is at least one layer 96 of an encapsulated organic pigment or thermochromic material such as a thermochromic ink. In the sheet approach, it is preferable to apply the thermochromic layer 96 to the heater layer 94 by spray painting.

The thermochromic material may be an engineered ink such as that manufactured by Matsui International Co., Inc. located at 1501 West 178th Street, Gardena, Calif. 90248. Essentially, the thermochromic material is an encapsulated organic pigment in the form of a silk screen ink. The ink may be formulated, as in this case, with a memory or hysteresis. The thermochromic ink will undergo a color change upon a change in temperature. The various temperature ranges termed, the writing temperature range, the retention temperature range, and the erasure temperature range, may be engineered as desired.

Figure 7:
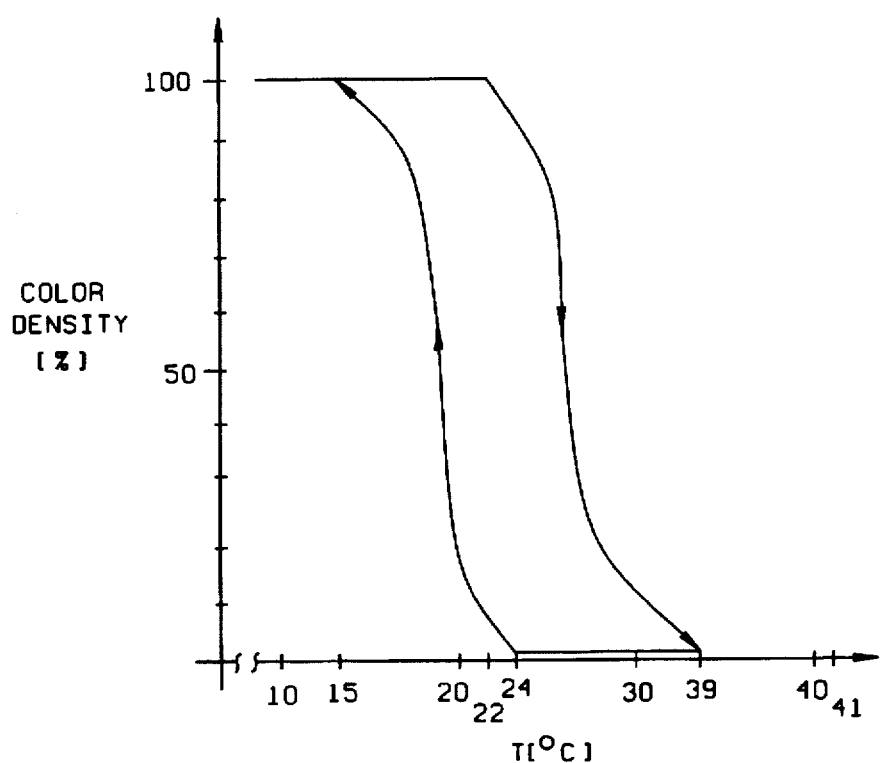
FIG. 7 is a graph of the hysteresis performance of the single color self-erasing thermochromic writing surface.

A graph of the performance (hysteresis) of the Matsui thermochromic ink is depicted in FIG. 7. The surface temperature of the thermochromic layer is depicted on the abscissa with the color density of the secondary color depicted on the ordinate. Color density refers to the percentage of appearance of the secondary color, with 0% denoting no color or change from the base color, and 100% denoting full color of the secondary color. It should be initially understood that the temperatures plotted on the abscissa and discussed below are preferable temperatures used in the preferred embodiment of the present writing surface. Other values may be engineered to work in various environments. These values have been chosen and utilized because they allow operation of the writing surface at normal room temperature, such as would be found in an office building or clean room environment.

Assume a starting temperature of 24° C. (75.2° F.), which is a normal room temperature, and the writing surface exhibiting only the base color, and not initially any secondary color. The base color is selected from a group of unlimited colors, while the secondary or change color is selected from a group of twelve (12) standard colors. In order to form a good contrast, the base color was chosen to be white, while the secondary color was black. If the temperature of the writing surface is raised to any point above 24° C., there is no color change and the writing surface continues to exhibit its base color.

For the temperature of 13° C.$<T \leq 24°$ C.,one can see that the writing surface exhibits partial secondary color conversion. As the temperature nears the 13° C. there is an almost 100% color density conversion of the secondary color. However, if the temperature of the writing surface dose not reach 13° C., the color will not be retained. However, if the temperature of the writing surface reaches 13° C. or below the writing temperature range, the secondary color reaches 100% color density. Thereafter, when the temperature of the writing surface is raised to within 13°C.$\leq T \leq 22°$ C., the retention range, the 100% color density is retained or there is a history or memory to the secondary color. Once the temperature of the writing surface is raised to between 22°C.$<T<34°$ C., there is a partial color density retention (the retention range) wherein the secondary color will still be seen and retained on the writing surface. However, when the temperature of the writing surface reaches above 34° C. (34° C.$\leq T$), the writing surface exhibits 0% color density of the secondary color, i.e. the secondary color disappears, the erasure temperature range. After obtaining the erasure temperature range, once the temperature of the writing surface is 24° C.$\leq T<34°$ C., the secondary color will not reappear and the base color will be retained. Only until the temperature of the writing surface reaches into the writing temperature range will the secondary color be exhibited again.

Figure 8:
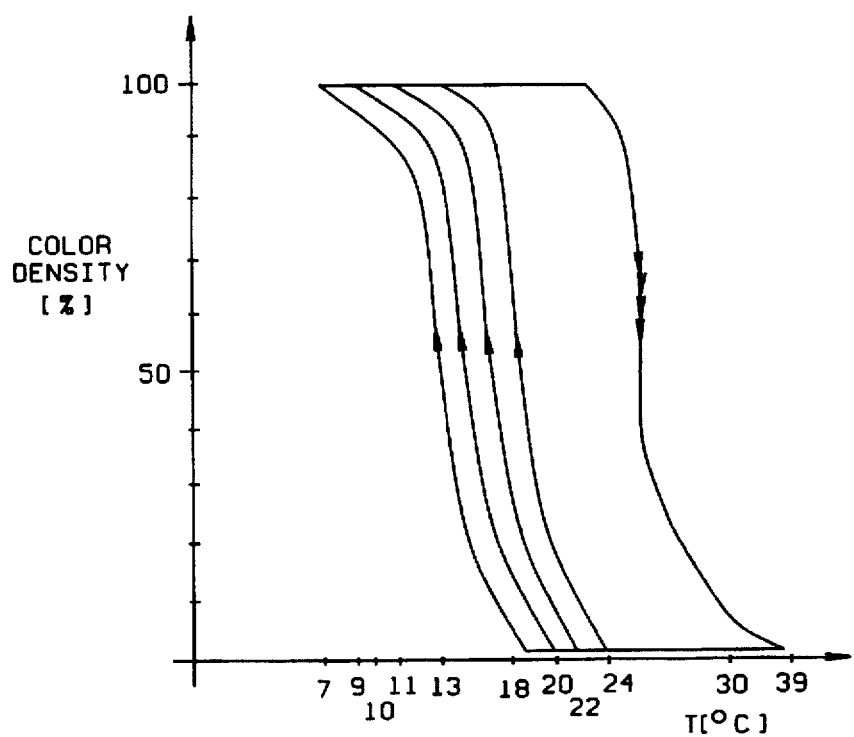
FIG. 8 is a graph of the hysteresis performance of the multi-color self-erasing thermochromic writing surface.

When utilizing several thermochromic material layers to achieve a multi-color writing system, each thermochromic layer is engineered to have a different secondary color changing temperature. This is illustrated in FIG. 8. While the same principles apply as in the single color writing system (FIGS. 7 and 9), the writing temperature ranges are different. Each thermochromic layer will exhibit its secondary color at a different lower temperature than the others. This makes it possible to write in different colors by utilizing a writing instrument capable of varying temperatures or by utilizing "color specific" writing instruments of a set temperatures.

Figure 9:
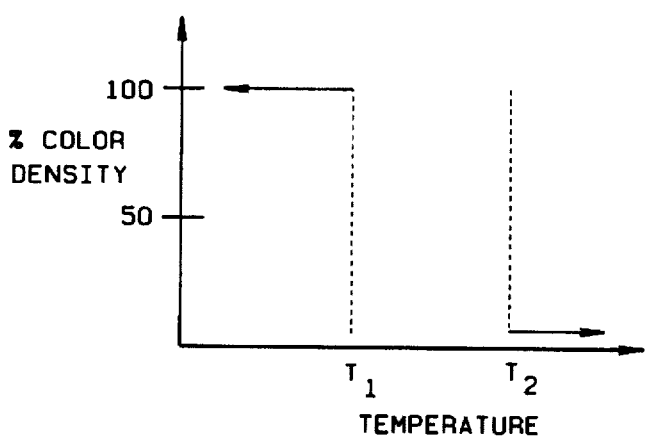
FIG. 9 is a graph of the performance of the ideal single color self-erasing thermochromic writing surface.

With additional reference to FIG. 9, the action of the ideal single color thermochromic ink will be described. As noted above, the thermochromic ink has a base or first color that is selected from a group of unlimited colors. The thermochromic ink also has a secondary color that is selected from a group of twelve (12) standard colors. In a single color system, the base color is preferably white, while the secondary color is preferably black. This provides a good contrast between the markings on the board and the board itself. The graph of FIG. 9 shows the relationship of temperature of the writing surface, depicted on the abscissa, to the color density of the secondary color, depicted on the ordinate. Again, color density refers to the percentage of appearance of the secondary color, with 0% meaning no color and 100% meaning full color.

The ideal thermochromic material performs as follows. When the temperature of any portion or all of the writing surface is greater than $T_1$, before ever being less than $T_1$, any portion or all of the writing surface exhibits the base color. The secondary color exhibits 0% color density, and is therefore absent, but in effect dormant. It should here be understood that with reference to the operation of the ideal thermochromic ink, the term writing surface includes the whole writing surface or any portion thereof. When the temperature of the writing surface falls to $T_1$ or below, the area to the left of $T_1$ designated the writing temperature range, the secondary color reaches 100% color density. The secondary color is thus exhibited wherever the temperature of the surface has fallen to or below $T_1$. Once the secondary color is exhibited, the surface temperature may rise to any temperature between $T_1$ and $T_2$, termed the retention temperature range, and the writing or markings will remain with a 100% color density. However, if the surface temperature rises to or above $T_2$, the color density of the secondary color falls to 0% or disappears. This is termed the erasure temperature range. Thereafter, when the surface temperature falls back to between $T_1$ and $T_2$, the color density of the secondary color remains at 0% and thus will not reappear until the surface temperature reaches the writing temperature range.

In an experimental embodiment of the writing surface, $T_1$ was selected to be 12° C. and the erasure temperature 42° C.

This range allows the writing surface to exhibit the base color at room temperature. Because of the above-noted characteristics of the thermochromic material, it is necessary to apply a cold surface to the writing surface in order to bring the temperature down into the writing temperature range. In this manner then, one may write, draw, or mark upon the writing surface without residue.

Figure 4:
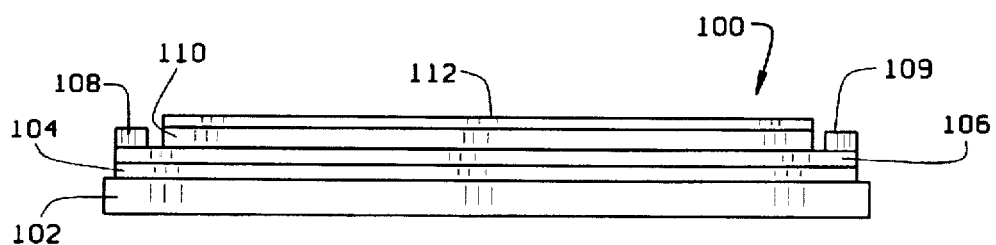
FIG. 4 is an enlarged side view of another embodiment of the self-erasing thermochromic structure, depicting the various laminations or layers.

With reference now to FIG. 4, a second embodiment of a writing surface as may be used in the writing systems of FIGS. 1 or 2 is shown. In general terms, FIG. 4 is an embodiment of the flexible film approach writing surface, generally designated 100. A sheet of polyester film or like material 104 serves as the carrier substrate. The polyester film 104 can be as thin as $2/1000$" (2 mil). Disposed on the carrier substrate 104 is a coating 106 of an electrically conductive material such as metal, and preferably an Indium Tin Oxide (ITO). Because the thermal mass of the polyester film 104 is relatively low, the size of the heater may be quite small. In this regard, the ITO coating 106 may be applied to the film 104 by sputter deposition or chemical vapor deposition. Such an ITO may be an ALTAIR™ -0-80-B-G-2 mil (0.002") from Southwall Technologies of 1029 Corporation Way, Palo Alto, Calif. 94303. Electrical leads 108, 109 are electrically coupled to the ITO coating 106 and are adapted to be electrically coupled to a source of electrical power (not shown). The electrical leads 108, 109 are preferably conductive inks screen printed onto the ITO coating 106. Such a conductive ink may be Electrodag® 461SS screenable silver conductive ink for ITO-coated substances from Achesono®.

Disposed on the ITO coating 106 is at least one coating 110, in the case of a single color surface, or multiple coatings in the case of a multiple color surface, of a thermochromic material such as that discussed above. Alternatively, in the case of a multiple color surface, a single layer of mixed thermochromic inks may be disposed on the ITO coating 106. Optionally disposed on the thermochromic coating(s) is a protective coating or layer 112. The protective coating 112 may be a thin plastic or the like. The polyester film 104 may optionally be mounted to a rigid backing 102 should such a rigid mounting be desired. It should be noted that the rigid backing 102 would not be a necessary component of this embodiment if the flexible thermochromic writing sheet were used, for example, in the particular type of writing system as depicted in FIG. 1.

As indicated above, the application of a cooled-tip writing instrument within the writing temperature range causes markings to appear on the writing surface. The ITO coating 106 heats the writing surface upon activation thereof to bring the temperature of the writing surface to within the erasure temperature range thereby effecting erasure of the writing surface. This, however, erases the entire writing surface. If only a partial erasure is desired, a heater matrix may be fashioned on the substrate such that coordinates of coheaters may effect spot erasure.

By utilizing only one type of thermochromic coating, a single color marking board is provided. A writing surface in accordance with the present teachings may have a white base or background color, like a current "whiteboard." The secondary color may be black, for instance, wherein application of a cold or cool surface within the writing temperature range cause the color change to black, for instance, on those portions of the writing surface locally cooled. In order to provide a writing surface capable of exhibiting a variety of colors, it is one embodiment to stack multiple layers of separate color particular thermochromic material, one upon the other. Another embodiment would be to mix thermochromic inks of the same base color, but different secondary colors and apply that mix as only one layer. In either case, each thermochromic layer or ink must be formulated to have the same base color, but must exhibit a color different from the secondary colors of the other thermochromic layers when the cooled tip writing instrument is applied thereto. It should be understood that with each thermochromic layer or single layer in the case of a "mix," there is a different writing temperature range and thus a different retention temperature range. The erasure temperature range may be constant. The different writing temperature ranges allows the user to write on the writing surface in different colors by utilizing several pens of pre-determined tip temperatures ("color-coded" by temperature) or with a single writing instrument capable of varying its tip temperature. As the temperature of the writing surface is lowered into the different writing temperature ranges, the different colors appear. However, because the higher temperature colors will remain, the color exhibited will be a composite color of the "activated" colors. Therefore, color composition may be an important element, but follows color or pigment mixing characteristics.

Because the thermochromic material is formulated such that when the temperature of any portion or segment of the writing surface is lowered to within a writing temperature range, the thermochromic material exhibits a second color, the writing instrument must have temperature lowering characteristics. In one manner, this is achieved by the thermally controlled writing instrument 56 depicted in FIG. 5. The pen 56 has a hollow body 58 made from aluminum or the like that defines an internal cavity or chamber 59. On one end of the body 58 is a thermoelectric module 60 with a conductive tip 62, such as copper or the like, coupled thereto. The thermoelectric module operates on electrical energy to produce local cooling in the conductive tip 62. Such a module may be a Frigichip® from MELCOR of 1040 Spruce Street, Trenton, N.J. 08648. Heat sink fins 120 are grooved or machined into the outer surface of the body 58 to provide heat dissipation for the thermoelectric module 60. On the other end of the body 58 is a threaded cap 61. Disposed inside the cavity 59 is a battery 66 or like electrical power source that is electrically coupled to an electronic control module 64. The control module 64 is electrically coupled to the thermoelectric module 60 and may include the necessary electronics to variably control the temperature of the tip 62 if necessary.

When the pen 56 is used with a single color thermochromic writing surface according to the present teachings, the tip 62 needs to achieve only a single predetermined temperature within the writing temperature range of the thermoelectric material. This may be accomplished by the control module or may be characteristic of the particular parameters of the thermoelectric module 60 and electrical supply energy.

When the pen 56 is used with a multiple color thermochromic writing surface according to the present teachings, the tip 62 must be capable of achieving multiple temperatures within the various writing temperature ranges of the various layers of thermochromic material. This may be accomplished by the control module 64 in conjunction with a user knob or dial (not shown). The dial would be adjustable through the entire range of writing temperature ranges. Therefore, in order to write in a particular color, the dial would be set to a color specific writing temperature range, which could be labeled on the pen 56 only by color. The control module 64 would regulate the temperature of the thermoelectric module 60 which would then cool the tip 62 to that particular color's writing temperature range. Application of the tip 62 to the writing surface would thus cause the contacted portion of the writing surface to exhibit the particular ("dialed") secondary color. It would also be possible to use multiple pens each of a predetermined tip temperature corresponding to the particular color. The pen would be color-coded to indicate what "color" pen was being used.

Further features of the pen 56 that may be incorporated into the control module 64 would be a motion detector or the like that would indicate whether or not the pen 56 was in use. If the pen 56 was in use, full electrical power would be supplied to the thermoelectric module 60. If the pen 56 was not in use, the control module 64 would either shut down the thermoelectric module 60 until motion was detected, or reduce the power consumption of the thermoelectric module 60. Other features may naturally be incorporated or programmed into the electronics of the control module 64.

Figure 5:
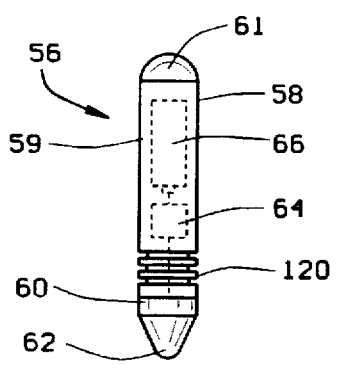
FIG. 5 is a front view of a writing instrument for the present self-erasing thermochromic writing structure.

The writing pen 56 depicted in FIG. 5 is a stand alone pen that would be utilized in a writing system such as that shown in FIG. 2 regardless of whether the writing board of the writing system was a single or multiple color board. If desired, the pen 56 may be coupled to the board in order to prevent disappearance of the pen 56.

Another embodiment of a writing instrument is depicted in FIG. 1, wherein the writing pen 30 is shown coupled to the writing board 21 via a line 32. In one variation, the line 32 supplies electrical power to the control module to control the temperature of the tip 33 via the thermoelectric module 31. This would obviously obviate the need for internal batteries that would need periodic replacing. Alternatively, the control module may be located in the board and wired to the pen. In another variation, the line 32 may carry a liquid or gas coolant that would be supplied to the tip 33 in place of the thermoelectric module 31 and electrical energy source therefor.

Figure 6:
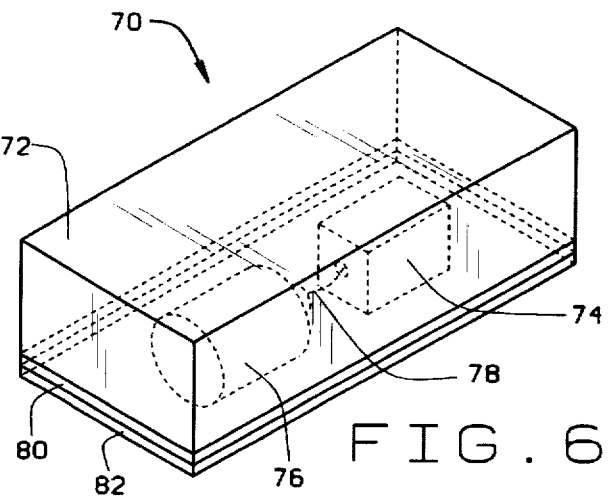
FIG. 6 is a perspective view of an eraser for the present self-erasing thermochromic writing structure.

Referring now to FIG. 6, an embodiment of a portable spot eraser 70 is shown. The portable spot eraser 70 may be used in conjunction with or in place of the integral heater of the writing surface to bring the temperature of portions of the writing surface within the erasure temperature range of the thermochromic material. As noted above, when the temperature of the writing surface reaches the erasure temperature range any portion of the writing surface exhibiting the secondary color(s) will thereafter exhibit the base color, thereby erasing the marks so created on the writing surface without any residue. The spot eraser 70 includes a housing 72 within which is disposed an electronic control module 74 that is coupled to a battery 76 via lead 78 for supplying electrical energy to the control module 74. The control module 74 is electrically coupled to a contact and substrate layer 80. A conventional surface type heater 82 is disposed on the outer side of the contact layer 80. The control module 74 thus regulates the temperature of the heater 82 such that it achieves a temperature within the erasure temperature range. Application of the eraser 70 to a spot on the writing surface, causes the writing at that spot to disappear.

As with the writing instrument, the eraser may be coupled to the writing board and obtain its power therefrom in order to obviate the need for internal batteries. Additionally, such tie-in prevents the disappearance of the eraser from the writing system.

In view of the advances in polymers, the present invention may be characterized by a thermochromic substrate that is an electrically conductive and heat generating polymer. The thermochromic polymer may be intrinsically conductive and therefore may function as a heater, or may be chemically doped to provide a heater. Therefore, the heater layer and the thermochromic layer may be one in the same. Multiple colors may be achieved as above.

While the foregoing is directed to the preferred embodiment of the present invention, other and further embodiments of the invention may be devised without departing from the basic scope thereof, and the scope thereof is determined by the claims which follow.

What is claimed is:

1. A self-erasing writing structure for use with a cooled-tip writing instrument, the self-erasing writing structure comprising:

a substrate;

a first layer of an electrically conductive material disposed on said substrate;

a second layer of a thermochromic material disposed on said substrate, said thermochromic material having a writing temperature range, a retention temperature range, and an erasure temperature range, said thermochromic material of a first color when the temperature thereof is within said erasure temperature range and also within said retention temperature range before ever being within said writing temperature range, said thermochromic material of a second color when the temperature thereof is within said writing temperature range and thereafter within said retention temperature range until reaching said erasure temperature range wherein said thermochromic material changes to said first color and remains said first color when back within said retention temperature range;

a source of electrical power; and electrical leads coupled to said source of electrical power and said first layer to selectively allow power from said source of electrical power to generate heat in said first layer and thus said second layer thereby bringing the temperature of said second layer within said erasure temperature range.

2. The structure of claim 1, wherein said first color is white and said second color is selected from a group consisting of blue, red, green, yellow, black, brown, and purple.

3. The structure of claim 1, wherein said second layer is disposed on said first layer.

4. The structure of claim 1, further comprising:

a third layer of a protective material disposed on said second layer.

5. The structure of claim 1, wherein said conductive material is indium tin oxide.

6. The structure of claim 1, wherein said electrical leads are screen printed electrical buses.

7. The structure of claim 1, wherein said substrate is polyester.

8. The structure of claim 1, further comprising:

a rigid support disposed underneath said substrate.

9. The structure of claim 1, wherein said writing temperature range is below said erasure temperature range and said retention temperature range is below said writing temperature range and said erasure temperature range.

10. The structure of claim 9, wherein said writing temperature range is approximately below 13° C., said erasure temperature range is approximately above 41° C., and said retention temperature range is between 13° C. and 41° C. inclusive.

11. A self-erasing writing system comprising:

a substrate;

a first coating disposed on said substrate, said first coating of a material capable of generating heat upon application of suitable electrical power;

a second coating of a thermochromic material disposed on said substrate, said thermochromic material having a writing temperature range, a retention temperature range, and an erasure temperature range, said thermochromic material of a first color when the temperature thereof is within said erasure temperature range and also within said retention temperature range before being within said writing temperature range, said thermochromic material of a second color when the temperature thereof is within said writing temperature range and thereafter within said retention temperature range until reaching said erasure temperature range wherein said thermochromic material changes to said first color and remains said first color when back within said retention temperature range; and a writing instrument having a tip whose temperature is capable of being within said writing temperature range, where in application of said tip to a point on said thermochromic material when said tip is within said writing temperature range causes said point on said thermochromic material to be in said writing temperature range;

an electrical bus disposed on said substrate and electrically coupled to said first coating; and a source of electrical energy coupled to said electrical bus to selectively supply the suitable electrical power to said first coating such that said first coating generates heat within said erasure temperature range and thus said second coating is raised to said erasure temperature range.

12. The self-erasing writing system of claim 11, wherein said writing instrument includes a thermoelectric module operating on the Peltier effect, and a second source of electrical power for operating said thermoelectric module.

13. The self-erasing writing system of claim 12, wherein said second source of electrical power is batteries contained in the instrument.

14. The self-erasing writing system of claim 12, wherein said second source of electrical power is said source coupled to said electrical bus.

15. The self-erasing writing system of claim 9 further comprising:

a heatable eraser capable of reaching said erasure temperature range upon application of electric power wherein application of said heatable eraser to a location on said second coating when said heatable eraser has attained said erasure temperature causes by heat transfer said second coating to be raised to said erasure temperature at and proximate to the application location.

16. The self-erasing writing structure of claim 11, wherein said substrate is polyester and said electrical bus is screen printed.

17. The self-erasing writing structure of claim 11, wherein said first color is white and said second color is selected from a group consisting of blue, red, green, yellow, black, brown, and purple.

18. A self-erasing writing board comprising:

a rigid support having a front face and a rear face;

a substrate having a top surface and a bottom surface, said bottom surface disposed on said front face of said rigid support;

a first layer disposed on said top surface of said substrate, said first layer of an electrically conductive material capable of generating heat upon application of suitable electric power;

an electrical bus disposed on said first layer and in electrical communication therewith and to the suitable electric power;

a second layer of a thermochromic material disposed on said first layer, said thermochromic material having a writing temperature range, a retention temperature range, and an erasure temperature range, said thermochromic material of a first color when the temperature thereof is in said erasure temperature range and also in said retention temperature range before ever being in said writing temperature range, said thermochromic material of a second color when the temperature thereof is in said writing temperature range and thereafter in said retention temperature range until reaching said erasure temperature range wherein said thermochromic material changes to said first color and remains said first color when back in said retention temperature range; and a carriage-type copier mechanism movably supported on said rigid support and adapted to copy said second color upon actuation thereof by moving across said thermochromic material.

19. The self-erasing writing board of claim 18, further including a writing instrument having a tip capable of being in said writing temperature range such that application of said tip to a location on said thermochromic material when said tip is within said writing temperature range causes by heat transfer said location on said thermochromic material to be in said writing temperature range.

20. The self-erasing writing board of claim 19, further comprising a heatable eraser capable of being in said erasure temperature range wherein application of said heatable eraser to a location on said thermochromic material when said heatable eraser is within said erasure temperature range causes said thermochromic material to be within said erasure temperature range until deapplied.

21. The self-erasing writing board of claim 18, wherein said first color is white and said second color is selected from a group consisting of blue, red, green, yellow, black, brown, and purple.

22. The self-erasing writing board of claim 18, wherein said substrate is polyester.

23. The self-erasing writing board of claim 18, further comprising a protective layer disposed on said second layer.

24. The self-erasing writing board of claim 18, wherein said first layer is indium tin oxide.

25. A self-erasing writing board comprising:

a rigid support;

a substrate disposed on said rigid support;

a first coating of an electrically conductive material disposed on said substrate that generates heat upon application of suitable electric power;

electrical buses disposed on and electrically coupled to said first coating;

a plurality of coatings of separate thermochromic material disposed over said first coating, each coating of said separate thermochromic material having a writing temperature range, a retention temperature range, and an erasure temperature range, each separate thermochromic material of a same first color when the temperature thereof is within said erasure temperature range and within respective said retention temperature ranges before ever being in respective said writing temperature ranges, each said separate thermochromic material of a different second color when the temperature thereof is within respective said writing temperature ranges and thereafter within respective said retention temperature ranges until reaching said erasure temperature range wherein each said separate thermochromic material changes to said first color when back within respective said retention temperature ranges, and each said writing temperature range is incrementally below the preceding temperature range.

26. The self-erasing writing board of claim 25, further comprising a plurality of writing instruments corresponding in number to said plurality of coatings, each one of said plurality of writing instruments having a tip capable of being within a respective said writing temperature range such that application of the respective tip to a location on the board causes the respective and corresponding said thermochromic material to change to said second color at said application location when said respective tip is within the respective said writing temperature range.

27. The self-erasing writing board of claim 25, further comprising a writing instrument having a tip that is adapted to be variably within each respective said writing temperature range such that application of said tip to a location on the board will cause respective said thermochromic material to change to the respective said second color at the application location when said tip is within the respective said writing temperature range.

28. A self-erasing writing board comprising:

a rigid support having a first vertical roller on one end thereof and a second vertical roller on another end thereof;

a continuous substrate sheet disposed around said first and second rollers such that said sheet is movable around said rollers;

a first coating of an electrically conductive material disposed on one full side of said sheet, said first coating capable of heating to an erasure temperature range upon application of suitable electric power;

a first electrical bus coupled to said first coating;

a second coating of an electrically conductive material disposed on another full side of said sheet, said second coating capable of heating to said erasure temperature upon application of the suitable electric power;

a second electrical bus coupled to said second coating;

a third coating of a thermochromic material disposed on said first and second coatings, said thermochromic material of a first color when the temperature thereof is within said erasure temperature range and also within a retention temperature range before ever being within a writing temperature range, said thermochromic material of a second color when the temperature thereof is within said writing temperature range and thereafter within said retention temperature range until reaching said erasure temperature range wherein said thermochromic material changes to said first color and remains said first color when back within said retention temperature range;

an electronic copy mechanism adapted to reproduce one side of said sheet at a time; and a writing implement having a tip capable of being in said writing temperature range, wherein application of said tip to a point on said thermochromic material when said tip is within said writing temperature range causes said point on said thermochromic material to be in said writing temperature range; and a source of electrical power coupled to said first and second electrical buses to selectively supply the suitable electric power to said first and second coatings such that said first and second coatings generate heat within said erasure temperature range and thus said third coating is raised to within said erasure temperature range.

29. The self-erasing writing board of claim 28, wherein said source of electrical power is coupled to said first and second electrical buses by friction contact with one of said first and second rollers.

30. The self-erasing writing board of claim 28, wherein said source of electrical power is coupled to said first and second electrical buses via a split strip.

31. A writing surface structure, wherein markings produced on the writing surface of the structure are self-erasing upon application of electrical energy to the writing surface structure, the writing surface structure comprising:

a flexible carrier substrate;

a layer of electrically conductive matter disposed on said flexible carrier substrate, said layer of electrically conductive matter adapted to be coupled to the source of electrical energy and to generate heat upon application of the electrical energy; and a layer of an encapsulated organic pigment disposed on said layer of electrically conductive matter, said encapsulated organic pigment formulated to have a base color, a secondary color, a writing temperature range, a hold temperature range, and an erasing temperature range, characterized in that, first, when the temperature of any segment of the writing surface is within said hold temperature range before ever being within said writing temperature range or after having been within said erasing temperature range the said encapsulated organic pigment at that segment of the writing surface exhibits said base color, second, when the temperature of any segment of said writing surface is within said writing temperature range the said encapsulated organic pigment at that segment of the writing surface exhibits said secondary color, and third, when the temperature of any segment exhibiting said secondary color is brought to within said erasure temperature range upon application of the electrical power to said layer of electrically conductive matter, that segment of the writing surface again exhibits said base color.

32. The writing surface structure of claim 31, wherein said flexible carrier substrate is a plastic sheet.

33. The writing surface structure of claim 31, wherein said electrically conductive matter is indium tin oxide.

34. The writing surface structure of claim 31, wherein said encapsulated organic pigment is a thermochromic ink.

35. The writing surface structure of claim 31 wherein said erasing temperature range is above said hold temperature range and partially overlapping in temperature range with a high end of said hold temperature range, and said writing temperature range is below said hold temperature range and partially overlapping in temperature range with a low end of said hold temperature range thereby defining a color density hysteresis curve.

36. A self-erasing writing surface for use with a cooled-tip writing instrument, the self-erasing writing surface comprising:

a substrate;

a layer of an electrically conductive thermochromic polymer disposed on said substrate, said thermochromic polymer having a writing temperature range, a retention temperature range, and an erasure temperature range, said thermochromic polymer of a first color when the temperature thereof is within said erasure temperature range and also within said retention temperature range before ever being within said writing temperature range, said thermochromic polymer of a second color when the temperature thereof is within said writing temperature range and thereafter within said retention temperature range until reaching said erasure temperature range wherein said thermochromic polymer changes to said first color and remains said first color when back within said retention temperature range;

a source of electrical power; and electrical leads coupled to said source of electrical power and said thermochromic polymer to selectively allow power from said source of electrical power to generate heat in said first thermochromic polymer to thereby bring the temperature of said thermochromic polymer within said erasure temperature range.

* * * * *